United States Patent
Nanbu

(10) Patent No.: US 6,851,636 B2
(45) Date of Patent: Feb. 8, 2005

(54) FISHING REEL

(75) Inventor: Kazuya Nanbu, Saitama (JP)

(73) Assignee: Daiwa Seiko, Inc., Tokyo (JP)

( * ) Notice: Subject to any disclaimer, the term of this patent is extended or adjusted under 35 U.S.C. 154(b) by 14 days.

(21) Appl. No.: 09/961,206

(22) Filed: Sep. 24, 2001

(65) Prior Publication Data

US 2002/0053617 A1 May 9, 2002

(30) Foreign Application Priority Data

Sep. 22, 2000 (JP) ..................................... P.2000-288654

(51) Int. Cl.⁷ .............................................. A01K 89/01
(52) U.S. Cl. ............................................ 242/223; 43/4
(58) Field of Search ................................. 242/223, 225, 242/250, 253, 257; 43/4, 20

(56) References Cited

U.S. PATENT DOCUMENTS

| | | | | |
|---|---|---|---|---|
| 4,445,178 A | * | 4/1984 | Scheer et al. .................. | 700/90 |
| 4,697,758 A | * | 10/1987 | Hirose et al. ................ | 242/223 |
| 4,752,878 A | * | 6/1988 | Sigurdsson et al. ........... | 43/4.5 |
| 5,007,601 A | * | 4/1991 | Emura et al. ................ | 242/223 |
| 5,236,147 A | * | 8/1993 | Kaneko ........................ | 242/223 |
| 5,363,565 A | * | 11/1994 | Kaneko ........................ | 33/719 |
| 5,395,065 A | * | 3/1995 | Hirose ........................ | 242/223 |
| 5,503,341 A | * | 4/1996 | Kaneko et al. .............. | 242/223 |
| 5,553,940 A | * | 9/1996 | Nishihara .................... | 374/136 |
| 5,782,033 A | * | 7/1998 | Park et al. ................... | 43/4 |
| 5,833,154 A | * | 11/1998 | Kaneko ....................... | 242/223 |
| 6,053,443 A | * | 4/2000 | Nanbu et al. ................ | 242/223 |
| 6,056,218 A | * | 5/2000 | Nanbu ........................ | 242/223 |
| 6,126,103 A | * | 10/2000 | Nanbu ........................ | 242/223 |

FOREIGN PATENT DOCUMENTS

| | | |
|---|---|---|
| JP | H01-90365 | 6/1989 |
| JP | 4-276510 | 1/1992 |
| JP | H04-21986 | 2/1992 |
| JP | 5196732 | 8/1993 |
| JP | 6181668 | 7/1994 |
| JP | 2500266 | 3/1996 |
| JP | 2977978 | 9/1999 |

* cited by examiner

Primary Examiner—Emmanuel Marcelo
(74) Attorney, Agent, or Firm—Sughrue Mion, PLLC

(57) ABSTRACT

A fishing reel includes a reel body; a spool rotatably supported by the reel body; a revolutions counter detector for detecting number of revolutions of the spool; a line measurement device for measuring line length based on the result detected by the revolutions counter detector; an informing device for informing an angler about fishing information; a receiver for receiving a signal which includes the fishing information and is transmitted from a transmitter; and a controller for controlling the informing device to inform the angler about the fishing information from the receiver.

1 Claim, 9 Drawing Sheets

FISHING REEL

BACKGROUND OF THE INVENTION

The present invention relates to a fishing reel provided with a line measurement device for measuring line length (line release length and line reeling length) of a fishline.

Generally, various kinds of fishing reels provide the line measurement device for measuring the fishline release (line length) based on number of revolutions of a spool detected by a revolutions counter detector. An angler can reel out the line to put the tackle such as a hook and a weight to a predetermined depth based on the measured value of the line measurement device.

As disclosed in the Japanese Examined Utility Model No. 2500266, generally, a depth-from-surface display portion and a depth-from-bottom display portion are provided at a display mounted on a reel body. Length from the water surface to the tackle is displayed on the depth-from-surface display portion and length from the bottom to the tackle is displayed on the depth-from-bottom display portion based on the measured result of the line measurement device.

Generally, to put the tackle to the predetermined depth, two ways are known, one way is to utilize the depth from the water surface and the other way is that firstly the tackle touches down the bottom and then winding the tackle. Particularly, in the case of aiming a fish near the bottom or a fish at deep water, the other way is well used.

Recently, to grasp an exact position of a boat on the sea, the boat is provided with a position retrieval system such as GPS.

With respect to the GPS, the position of the boat is identified by receiving the signals respectively from a plurality of satellites and measuring the time difference of the signal arrival times. Since each of the satellites has an accurate clock, exact time at the present position can be known.

Accordingly, by knowing the exact time, it is possible to know ebb and flow of the sea and tidal current at the respective point which varies by drifting the boat by the tide. At present, the boatman (captain) gives, to the angler, the direction based on the data of the depth of the water, the tidal current, the ebb and flow, the current time and the like at the present position which is identified by a fishfinder, the GPS or the like. Therefore, the angler decides the predetermined depth where the tackle should be placed.

However, when the angler actually puts the tackle at the predetermined depth from the bottom, particularly in the very rough bottom, it is difficult to put the tackle at the exact desired point (depth) from the boat which constantly moves due to the tidal current. That is, it is difficult to put and maintain the tackle at the directed point (depth), and sometimes the tackle strays from the directed position. Further, the tackle is frequently caught on the raised reef.

Further, since the distance from the tackle to the bottom changes every time the tackle is cast, it takes a long time to put the tackle in the exact point (depth) so that the workability becomes low, and it affects a catch in fishing. Therefore, an improvement thereto has been eagerly anticipated.

SUMMARY OF THE INVENTION

In consideration of the above drawbacks, it is an object of the invention to provide a fishing reel in which the above problems is solved and the catch in fishing is improved.

In order to solve the aforesaid object, the invention is characterized by having the following arrangement.

A fishing reel is provided with a reel body; a spool rotatably supported by the reel body; a revolutions counter detector for detecting number of revolutions of the spool; a line measurement device for measuring line length based on the result detected by the revolutions counter detector; an informing device for informing an angler about fishing information; a receiver for receiving a signal which includes the fishing information and is transmitted from a transmitter, and a controller for controlling the informing device to inform the angler about the fishing information from the receiver.

The informing device may be a display for displaying the line length measured by the line measurement device, and the controller displays the fishing information on the display.

According to another aspect of the invention, a fishing reel for winding a fishline on a spool is provided. It includes a receiver for receiving fishing information from an outside of the fishing reel; an informing device for informing an angler about the fishing information; and a computer for receiving the fishing information from the receiver and sending the received fishing information to the informing device.

In a fishing system of the invention, a transmitter transmits fishing information, a fishing reel winds a fishline on a spool, a receiver receives the fishing information from the transmitter, and an informing device informs an angler about the fishing information from the receiver.

DETAILED DESCRIPTION OF PREFERRED EMBODIMENTS

Figure 1:
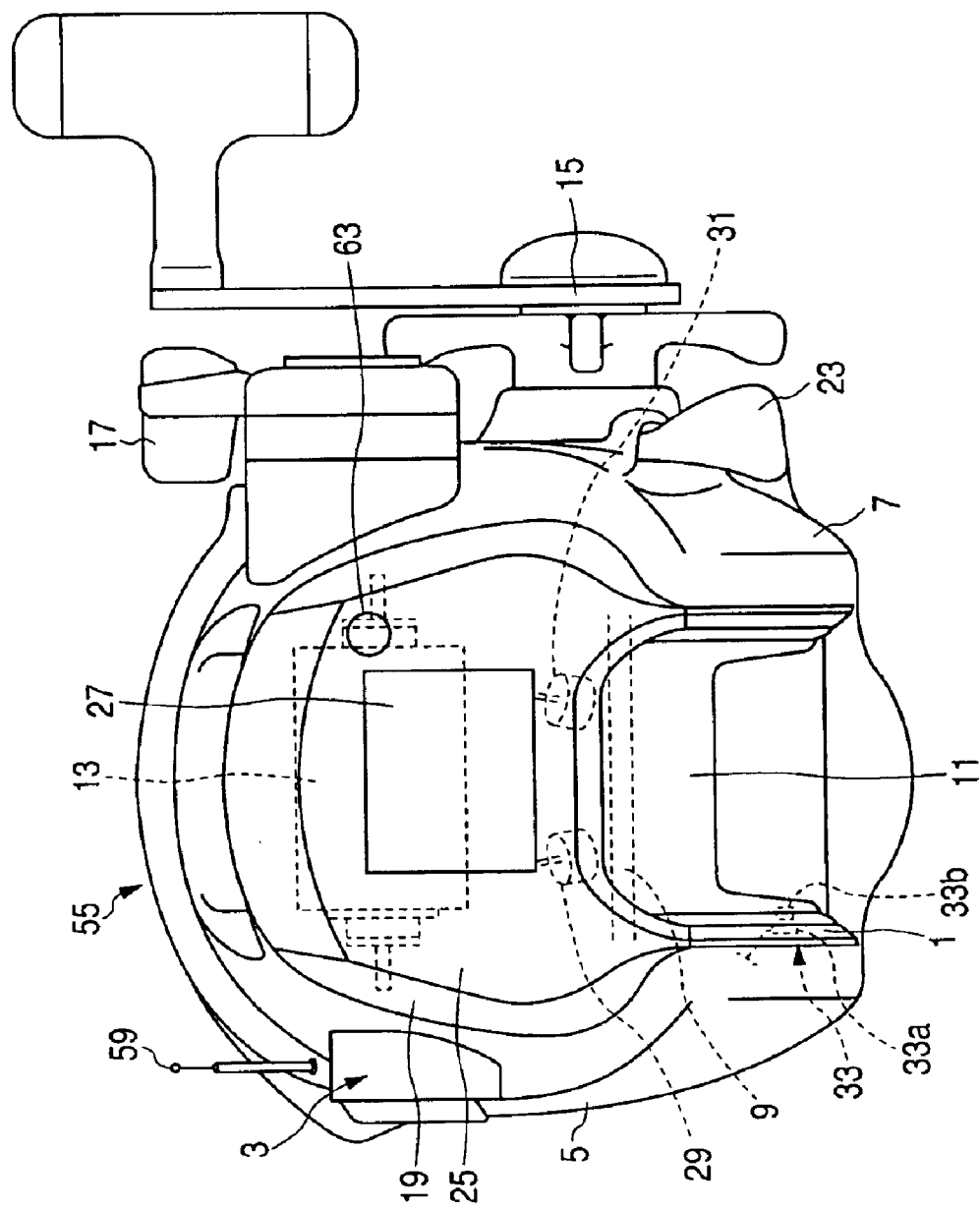
FIG. 1 is a plan view showing a fishing reel according to a first embodiment.

The invention will be described below based on embodiments shown in the drawings.

FIG. 1 shows a fishing reel according to the first embodiment. Reference numeral 1 is a frame which the frames 5, 7 of a reel body 3 is attached to opposite sides thereof A spool 11 is rotatably supported by a spool shaft 9 between the opposite frames 5, 7.

The spool 11 is adapted to wind a fishline thereon by driving a spool motor 13 or a winding operation of a handle 15. The spool motor 13 is accommodated in a motor case which is integrally formed at the front of the spool 11.

A power lever 17 for adjusting motor output of the spool motor 13 is attached to the upper front of the frame 7 and rotatable in the same direction as the handle 15, as a fishing reel disclosed in the Japanese Examined Patent Publication NO. 2977978. A microcomputer (controller)(FIG. 2) installed in a control box 19 controls winding speed of the spool 11 by continuously increasing and decreasing the motor output from a motor stopped state to a maximum value (0 to 100%) through motor drive circuit 22 by operating the power lever 17.

A clutch lever 23 of a clutch mechanism is attached to the rear of the frame 7. Transmission and cutoff of the driving force from the spool motor 13 or the handle 15 to the spool shaft 9 is controlled by operating ON/OFF state of the clutch lever 23.

The control box 19 is mounted on the frame 1 of the upper reel body 3. A liquid crystal display 27 for displaying a measured fishline length and a fishfinder data described later is provided on an operation panel 25 on the surface of the control box 19.

On the bottom of the control box 19, a transmitting ultrasonic sensor 29 and a receiving ultrasonic sensor 31 are mounted so as to be opposed to spool 11 and to be formed in V-shaped. A pair of a lead magnet 33a and a plurality of magnet 33b, as a revolutions counter detector 33 for detecting number of revolutions and revolution direction of the spool 11, are attached to the frame 11 and the periphery at the one side of the spool 11 opposed to the frame 11.

As similar to a line measurement device disclosed in Japanese Unexamined Patent Publication No. Hei. 4-276510, the microcomputer 21 measures, by timer, time difference t from when the ultrasonic sensor 29 shoots ultrasonic to a line wound surface of the spool 11, until when the ultrasonic sensor 31 receives the ultrasonic. Based on this time difference t, distance a between the line wound surface and both ultrasonic sensors 29, 31 is calculated by using the following expression (1) stored in ROM:

$$\text{Distance } a = \text{speed of sound } 331(m/sec) \times \tfrac{1}{2} \times t \qquad (1)$$

A line wound radius D of the fishline wound on the spool 11 is calculated by using the following expression (2) stored in the ROM:

$$\text{Line wound radius } D = (b-a) \times 2 \qquad (2)$$

b: distance between the ultrasonic sensors 29, 31 and the spool shaft 9.

Line length L is calculated based on the actual number of revolutions N measure by the revolutions counter detector 33 and the line wound radius D calculated by the expression (2) by using the following expression (3) stored in the ROM:

$$\text{Line length } L = \pi \times D \times N \qquad (3)$$

The result thereof is displayed on the display 27 through a display drive circuit 35.

Figure 3:
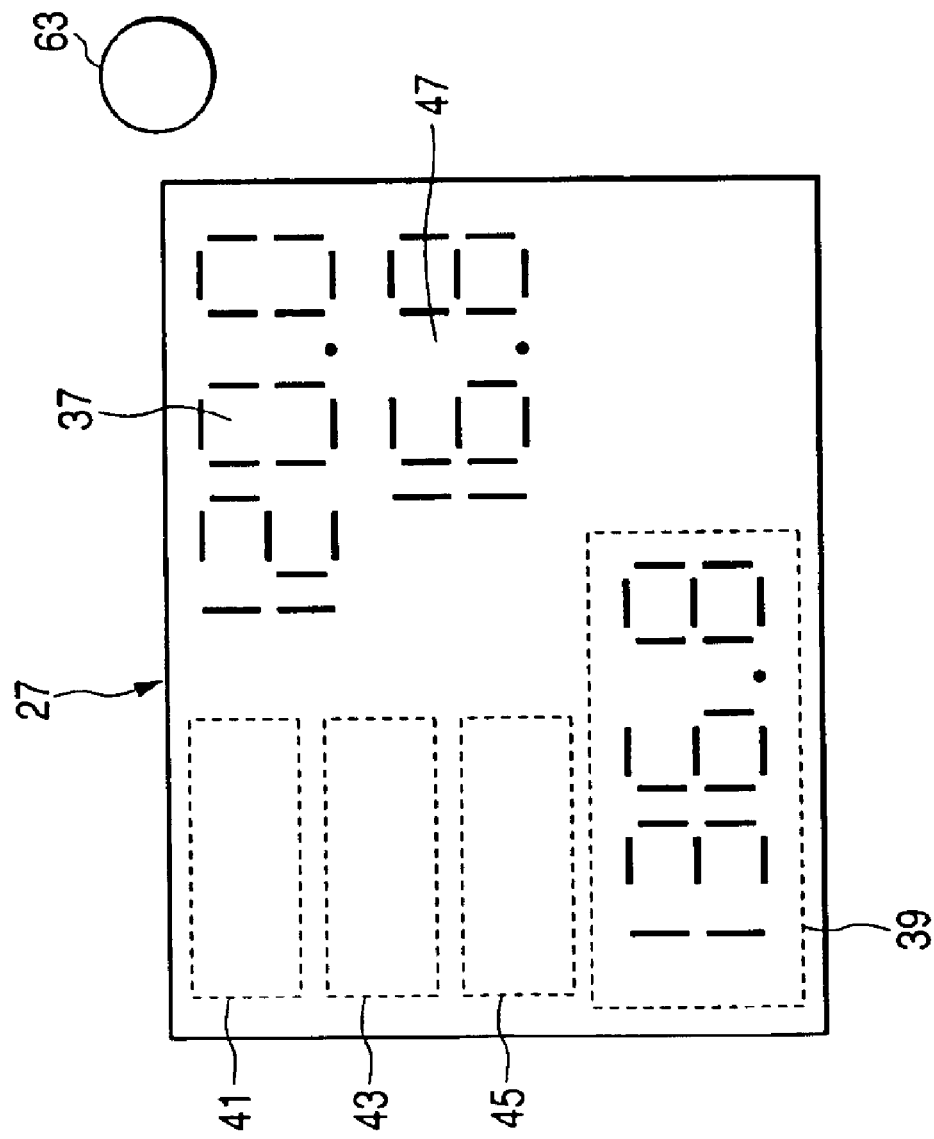
FIG. 3 is an enlarged plan view showing a display of the fishing reel.

The display 27 is constructed by a LCD in which tens of thousands to hundreds of thousands of three kinds of minute LCD elements are arrayed in two dimensions, similar to the well-known color liquid crystal monitor. As shown in FIG. 3, a depth-from-surface display portion 37 which displays a depth from a tackle such as a hook and a weight to the water surface is provided at the upper right of the display 27. A depth display portion 39 which displays a depth of water obtained by a fishfinder data, a water temperature display portion 41 which displays water temperature, a tidal current display portion 43 which display a tidal current, and an ebb-and-flow display portion 45 which displays an ebb-and-flow of the sea, are assigned at the left side of the display 27 in line. A depth difference display portion 47 which display a difference between the depth of the water obtained by the fishfinder data and the fishline length is assigned at the right side of the display 27 in line with the surface-from depth display 37.

Figure 2:
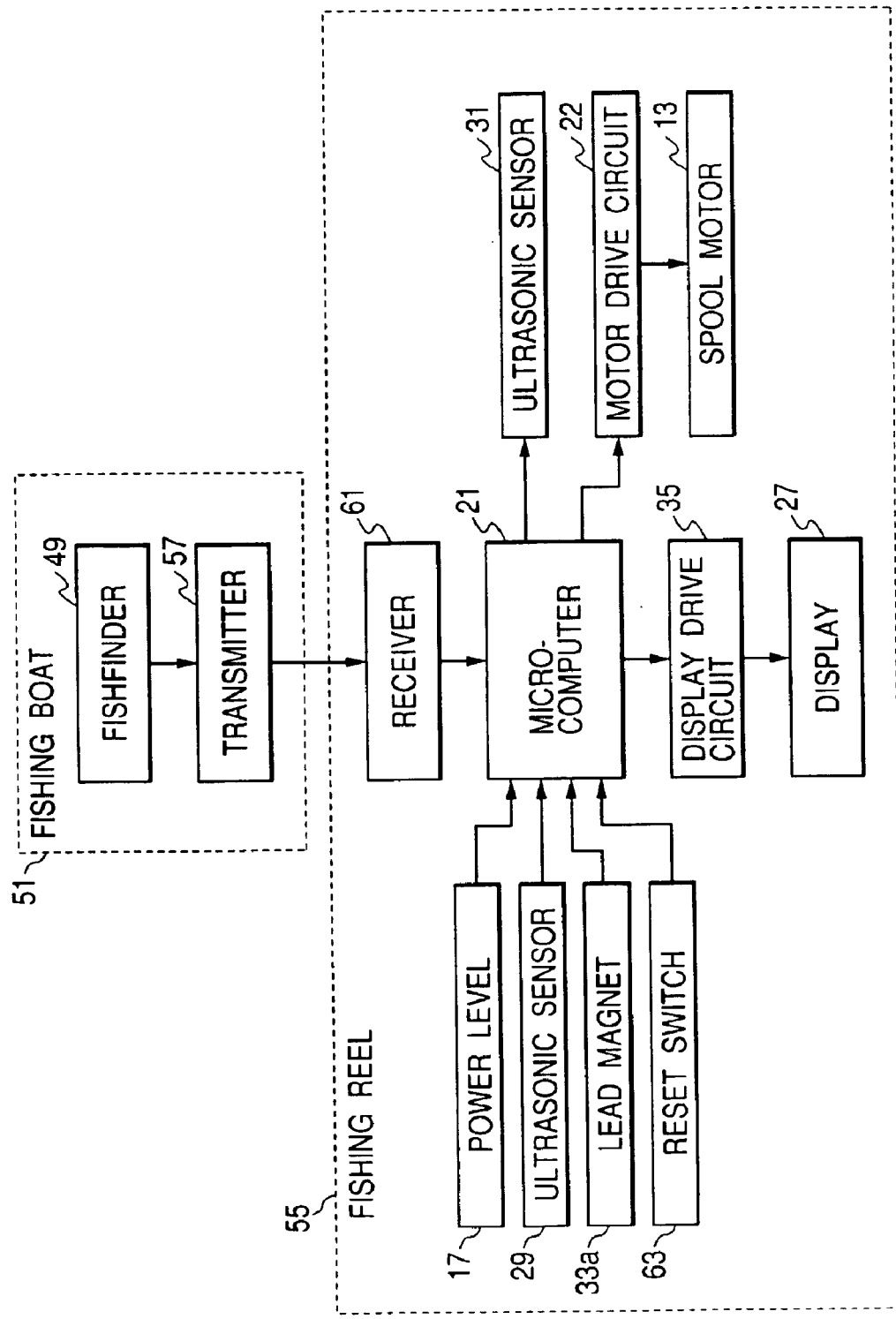
FIG. 2 is a control block diagram of the fishing reel shown in FIG. 1.
Figure 4:
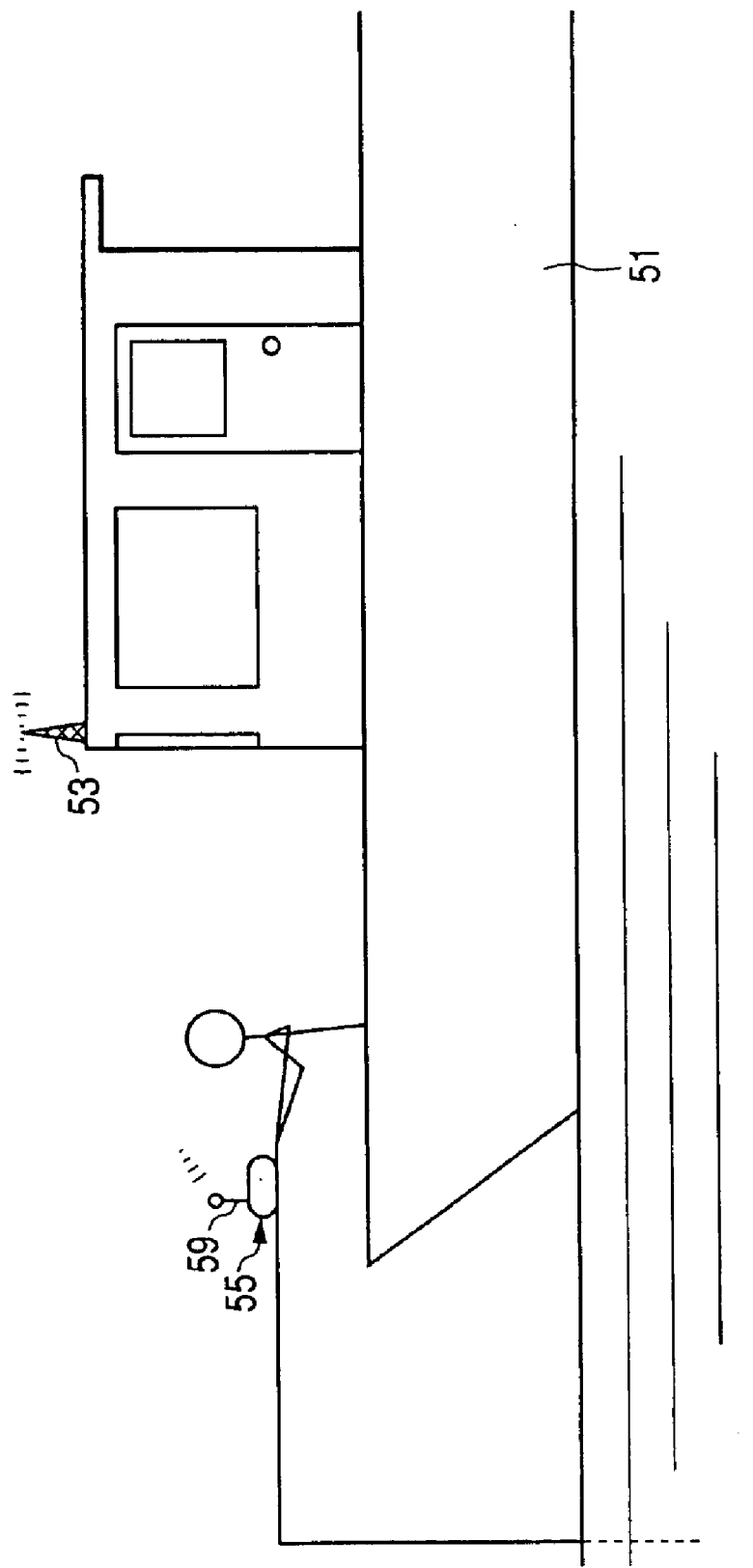
FIG. 4 is a schematic diagram showing a communication state of the fishing boat and the fishing reel when fishing.

That is, as is generally known, many fishing boats are provided with fishfinders, and a boatman (captain) informs an angler about a suitable fishing spot (depth of water), the depth of water and suitable tackle according to conditions, based on the fishfinder data. In the first embodiment as shown in FIGS. 2 to 4, a fishfinder 49 and a transmitter 57 for transmitting the fishfinder data to the fishing reel 55 through a transmitting antenna are installed in the equipped fishing boat. A receiver 61 for receiving the fishfinder data through a receiving antenna 59 is installed in the control box 19 of the fishing reel 55 so that the fishfinder data is inputted into the microcomputer 21.

The microcomputer 21 causes the display 27 to display the depth of water, the water temperature, the tidal current, ebb and flow and the like of the fishfinder data on the depth display portion 39, the temperature display portion 41, the tidal current display portion 43 and the ebb-and-flow display portion 45 of the display 26, respectively, and calculates the difference between the measured fishline length and the depth of water obtained by the fishfinder data to display the result on the depth difference display portion 27.

As shown in FIG. 1, the receiving antenna 59 is attached to the upper front of the frame 5 of the dishing reel 55.

On the operation panel 25, a reset switch 63 is provided adjacent to the display 27. By operating the reset switch 63, the display of the depth-from-surface display portion 37 is reset, and the display of the depth difference display portion 47 is updated in cooperation with the microcomputer 21.

According to the construction of the fishing reel 55 according to the first embodiment, when the clutch is disengaged by operating the clutch lever 23, the fishline is reeled out due to the weight of the tackle, and the fishline is wound on the spool 11 by winding operation of the power lever 17 and the handle 15. In this time, as described above, the microcomputer 21 calculates and obtains the line length L by using the expressions (3) based on the line wound radius D calculated by using the expression (2) and the actual number of revolutions N of the spool which is measured by the revolutions counter detector 33, and causes the display 27 to display the obtained result (line length L) on the depth-from-surface display portion 37.

On the other hand, the fishfinder data such as the depth of the water, the water temperature, the tidal current, the ebb-and-flow of the sea is transmitted from the fishing boat 51 through the transmitting antenna 53, and the receiver 61 of the fishing reel 55 receives the fishfinder data through the receiving antenna 59.

The microcomputer 21 causes the display 27 to display the fishfinder data such as the depth of the water, the water temperature, the tidal current, the ebb-and-flow of the sea on the depth display portion 39, the water temperature display portion 41, the tidal current display portion 43 and the ebb-and flow display portion 15 of the display 27, and calculates the difference between the measured fishline length and the depth of the water obtained by the fishfinder data so as to display the result on the depth difference display portion 47.

Accordingly, the angler can choose the tackle which is suitable for the conditions based on the depth of the water, the water temperature and the tidal current etc. which are displayed on the display 27. Further, when the boatman directs the angler that the fishing point (depth) is several meters or tens of meters from the bottom, the angler can put the tackle on the directed position while seeing the display on the depth difference display portion 47, and can adjust the fishing point (depth), by operating the handle 15, power lever 17 or the clutch lever 23, to keep the tackle along the bottom configuration which always varies.

According to the first embodiment, since the fishfinder data of the fishfinder 49 installed in the fishing boat 51 is transmitted, and the display 27 displays the fishfinder data received by the fishing reel 55, the angler can quickly respond to the good fishing point (depth) and suitable fishing action. Further, since the fishing reel receives the correct depth data obtained by the fishfinder 49 and displays it on the depth display portion 39, the angler can put the tackle on the directed fishing point (depth) which is meters from the bottom, and can always adjust the fishing point (depth) so as to keep the tackle along the bottom configuration which always varies. As a result, the catch in fishing is surely increased as compared to the conventional one.

Further, according to the first embodiment, if the bottom suddenly varies due to the raise of the reel or the like, since the fishfinder data such as the depth of the water and the tidal current is displayed, there is an advantage that the angler can easily and previously prevent the trouble such as the tackle caught by rocks by himself or herself.

Figure 5:
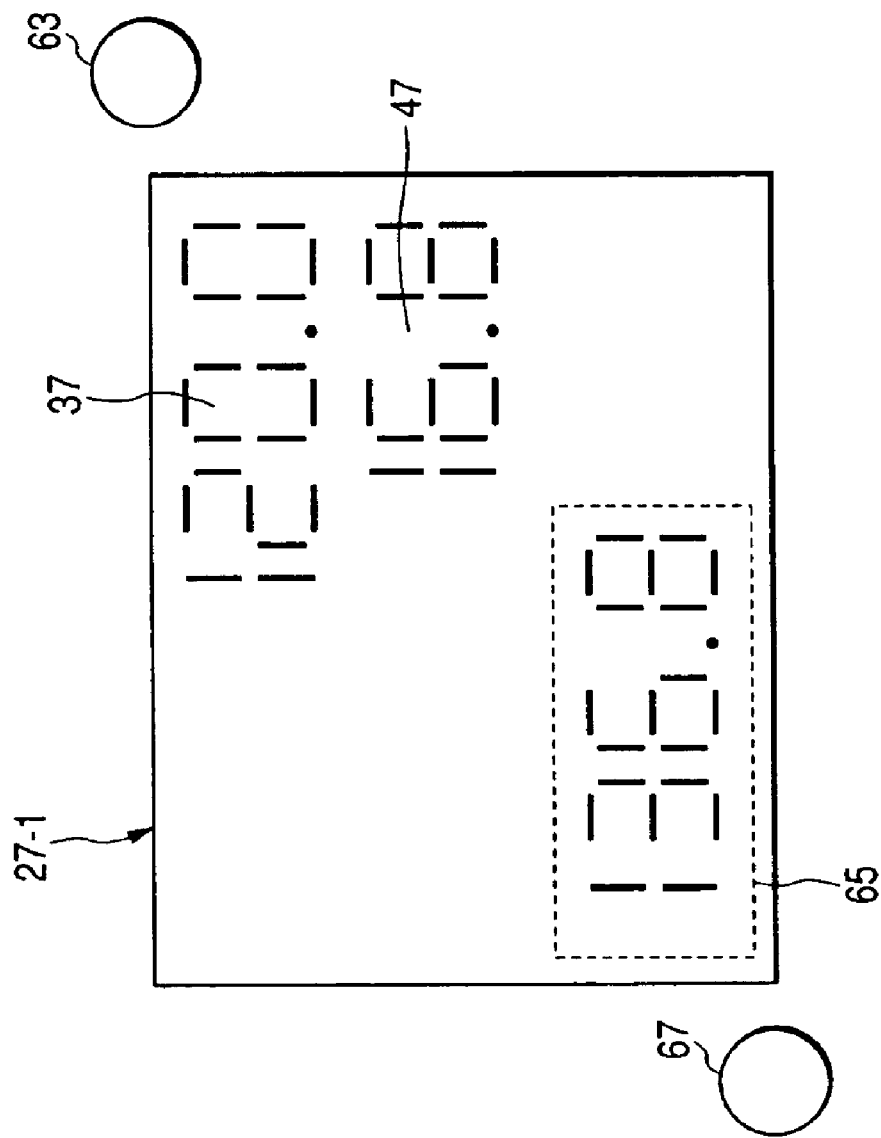
FIG. 5 is an enlarged plan view showing a display of the fishing reel according to a second embodiment.

Incidentally, as shown in FIG. 3, the depth display portion 39, the water temperature display portion 41, the tidal current display portion 43 and the ebb-and-flow display portion 45 are assigned in the display 27 in the line. However, as shown in FIG. 5 which shows a second embodiment of the present invention, the fishfinder data display portion 54 may be assigned in the display 27-1, and a change-over switch 67 may be provided at the operation panel 25 adjacent to the display 27-1, so that the fishfinder data such as the depth of the water, the water temperature, the tidal current, and the ebb and flow of the sea, etc. is sequentially displayed on the fishfinder display portion 65 by operating the change-over switch. According to the second embodiment, the above object can be achieved, similarly to the first embodiment.

FIGS. 6 to 9 show a third embodiment of the invention. As mentioned above, at present, the fishfinders and the GPS receivers for boats and ships are installed in many fishing boats, the present position of the boat and the exact time at the present position can be grasped by receiving the radio signal from the plurality of the GPS satellites. Therefore, the exact tidal current and the ebb and flow at the present position can be known by determining the exact time.

Figure 6:
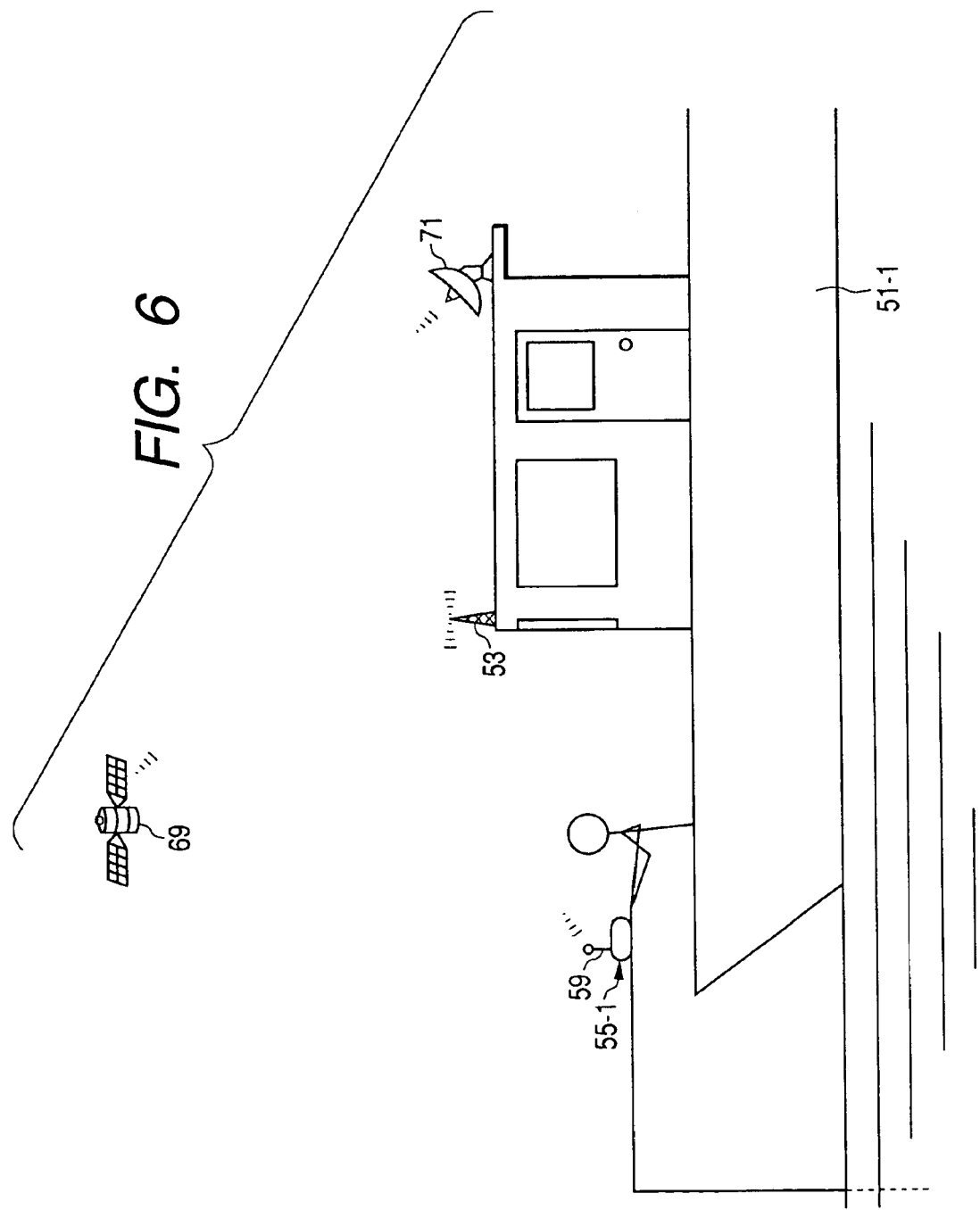
FIG. 6 is a schematic diagram showing a communication state of the fishing boat and GPS satellites according to a third embodiment.
Figure 7:
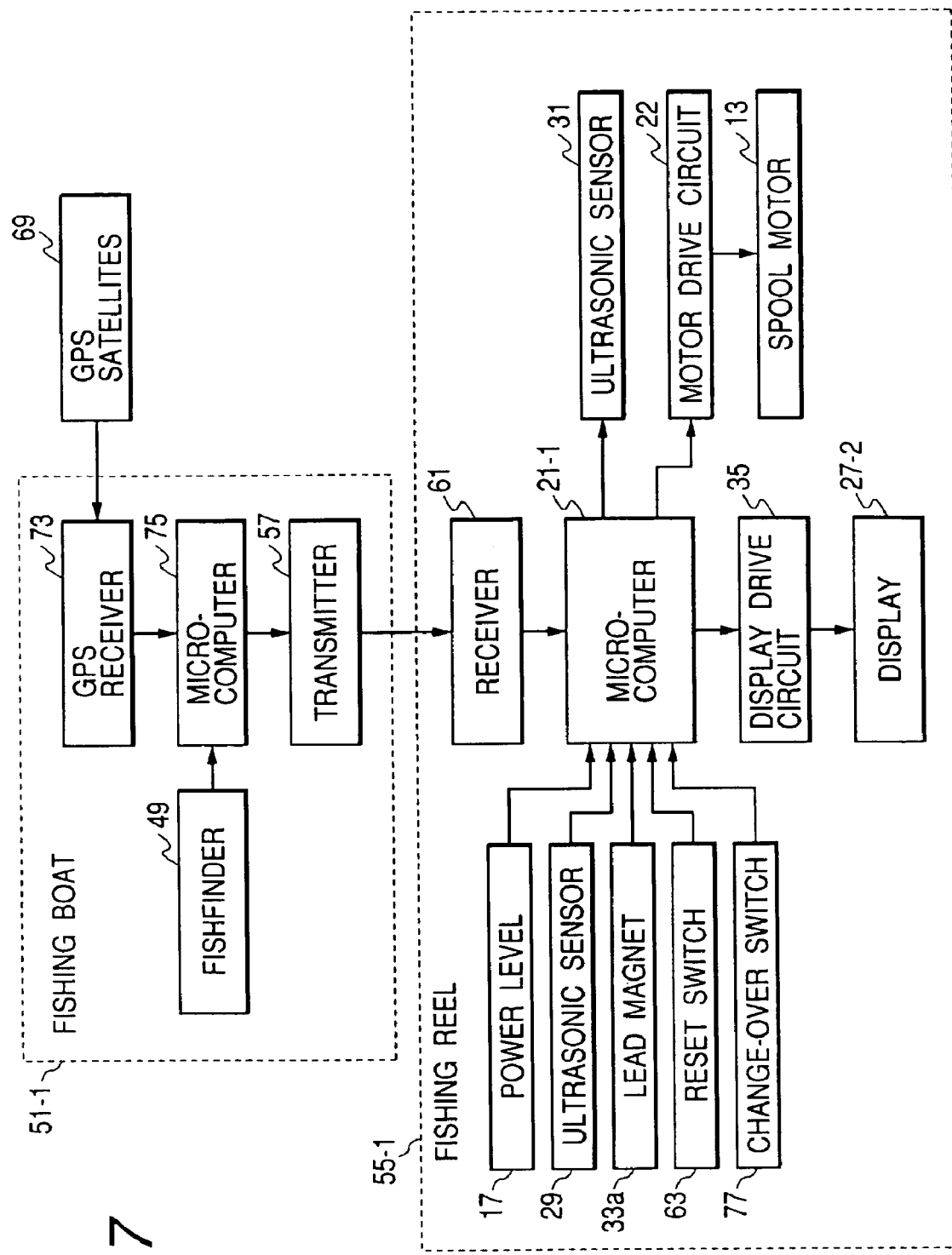
FIG. 7 is a control block diagram of the fishing reel according to the third embodiment.

In the third embodiment, as shown in FIGS. 6 and 7, A GPS receiver 73 for receiving radio signals from a plurality of the GPS satellites by a receiving antenna 71 and a microcomputer 75 connected to the GPS receiver 73 and the fishfinder 49 are installed in a fishing boat 51-1.

A plurality of fishing result log data in the point are stored in a ROM of a microcomputer 75. A CPU of the microcomputer 75 transmits the fishfinder data such as the depth of the water, the water temperature, the tidal current and the ebb and flow of the sea, etc. through a transmitter 57 and a transmitting antenna 53, and selects the suitable tackle and fishing point (depth) according to the conditions as "recommendation data" from the fishing result log data, and transmits it to the fishing reel 55-1.

Figure 8:
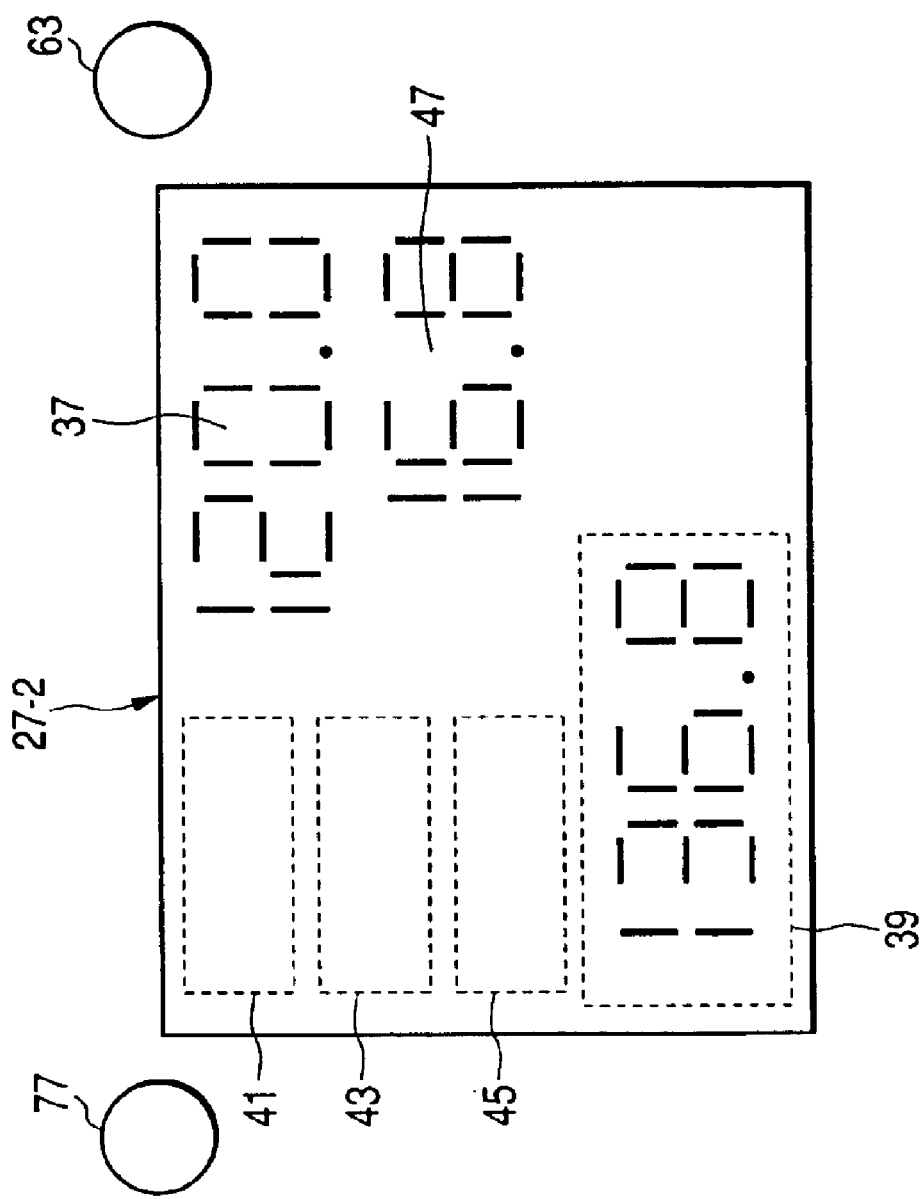
FIG. 8 is an enlarged plan view showing a display of the fishing reel according to the third embodiment.
Figure 9:
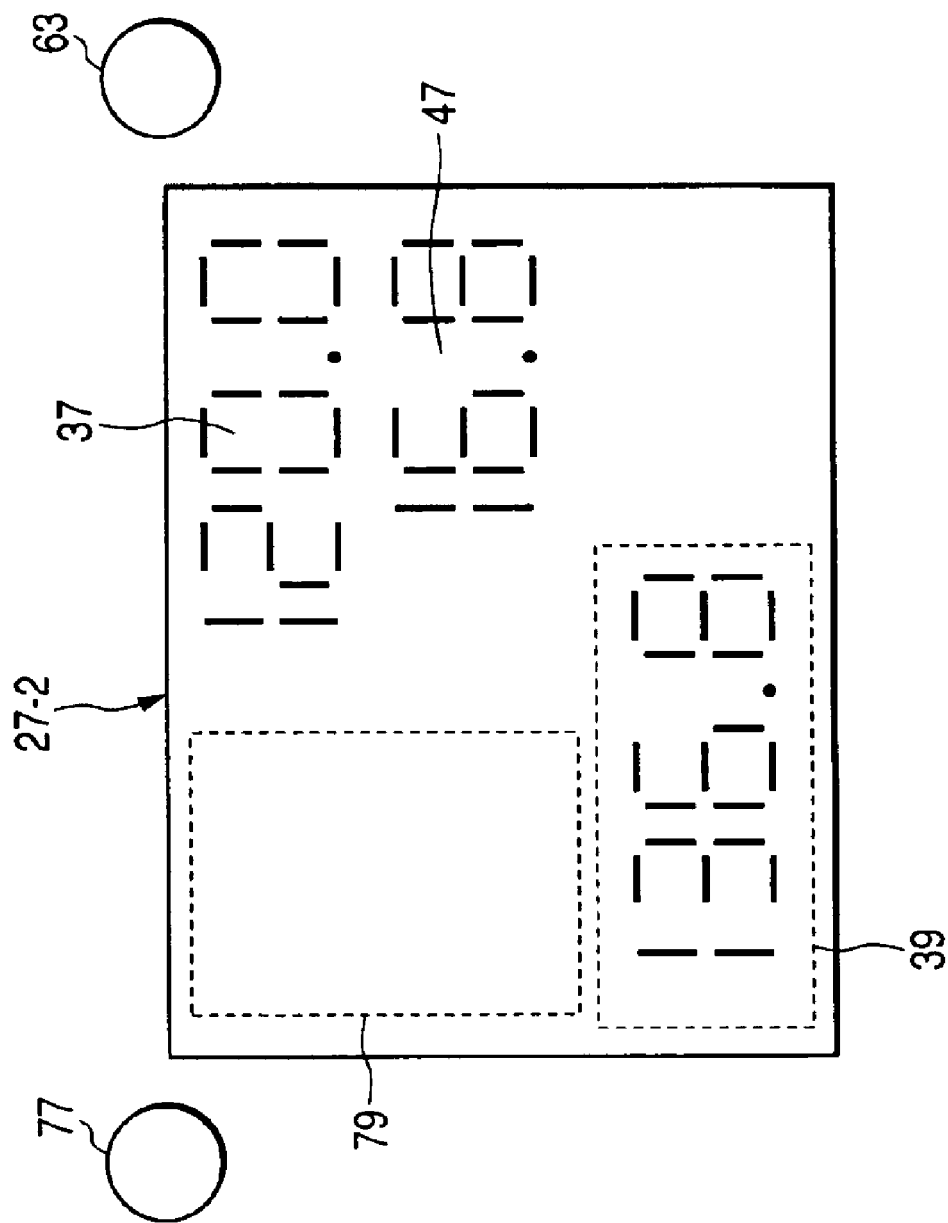
FIG. 9 is an enlarged plan view showing the display of the fishing reel according to the third embodiment.

On the other hand, as shown in FIG. 8, a depth-from-surface display portion 37, a depth display portion 39, a water temperature display portion 41, a tidal current display portion 43, a ebb-and-flow display portion 45, and a depth difference display portion 47 are assigned on the display 27-2 similar to the display 27 shown in FIG. 3. A changeover switch 77 is provided on an operation panel 25 adjacent to the display 72-2.

When the angler operates the changeover switch 77, a microcomputer 21-1 of the fishing reel 55-1 changes the water temperature display portion 41, the tidal current display portion 43 and the ebb-and-flow display portion 45 to a recommendation data display portion 79 and displays the received recommendation data on the recommendation data display portion 79. When the angler re-operates the change-over switch 77, the microcomputer 21-1 changes the recommend ation data display portion 79 to the water temperature display portion 41, the tidal current display portion 43 and the ebb-and-flow display portion 45, and displays the fishfinder data received by the receiver 61 on the respective display portion 41, 43, 45, as similar to the first embodiment shown in FIG. 1.

Other structures are almost the same as those in the first embodiment and the description thereof is omitted.

According to the structure of the third embodiment, the microcomputer 21-1 calculates the fishline length L by using the expression (3) based on the actual number of the revolutions of the spool 11 measured by the revolutions counter detector 33 and display their result (fishline length L) on the surface-from display portion 37.

On the other hand, in the fishing boat 51-1, the microcomputer 75 transmits the fishfinder data, from the fishfinder 49, such as the depth of the water, the water temperature, the tidal current and the ebb and flow of the sea, etc. to the fishing reel 55-1 through the transmitter 57 and the transmitting antenna 53, and selects the recommendation data based on the fishing result log data at the point where the fishing boat 51-1 is, and transmits the recommendation data to the fishing reel 51-1 through the transmitter 57 and the transmitting antenna 53.

The fishing reel 55-1 receives the fishfinder data and the recommendation data through the receiving antenna 59. Then, the microcomputer 21-1 display the fishfinder data such as the depth of the water, the water temperature, the tidal current and the ebb and flow of the sea, etc. on the depth display portion 39, the water temperature 41, the tidal current display portion 43 and the ebb-and-flow display portion 45, respectively, displays the measured line length on the depth-from-surface display portion 37, and calculate the difference between the line length and the depth of the water obtained by the fishfinder and displays the result on the depth difference display portion 47.

When the angler operates the change-over switch 77, the microcomputer 21-1 changes the water temperature display portion 41, the tidal current display portion 43 and the ebb-and-flow display portion 45 to a recommendation data display portion 79 and displays the received recommendation data on the recommendation data display portion 79.

Therefore, similarly to the first embodiment, when fishing, the angler can choice the suitable tackle according to the conditions based on the displayed depth of the water, water temperature and tidal current, and further if the fishing point (depth) is directed such that the fishing point (depth) is from meters from the bottom, the angler can put the tackle on the directed position while seeing the display on the depth difference display portion 47, and can adjust the fishing point (depth), by operating the handle 15, power lever 17 or the clutch lever 23, to keep the tackle along the bottom configuration which always varies.

Further, if the recommendation data is displayed on the recommendation data display portion 77 by operating the change-over switch 77, even beginners can easily know the suitable tackle and fishing point (depth) according to the conditions.

According to the third embodiment, in addition to the fishfinder data of the fishfinder 49, based on the radio from the GPS satellites 69, the microcomputer 75 of the fishing boat 51-1 selects the recommendation data based on the fishing result log data and the fishfinder data at the present position and the transmits the data to the fishing reel 55-1, and the data is received by the receiver 61 installed in the fishing reel 55-1 and is displayed on the display 27-1. Therefore, the catch in the fishing are further increased as compared with the first embodiment.

Further, if a satellite communication system or the like is installed in the reel or the fishing boat in addition to the structure of the third embodiment, it becomes easy to connect into the Internet like the cellular phone connecting. Therefore, the data can be newly collected and stored, and the stored data can be update any time since it can receive the latest information. Further, since the capacity of the stored data can be increased, it is possible to provide the most suitable and exact data at the present point.

Incidentally, the above embodiments employ the way the data processed at the fishing boat side is transmitted from the fishing boat and is received and displayed on the display. However, in case of data of GPS or the like, the non-processed data may be received by the reel side and then be processed at the reel side and the processed data may be displayed on the display. Moreover, instead of the display or in addition to the display, an informing device such as a display, a speaker or the like may be employed. Further, instead of the above-mentioned GPS, an external transmitter may be installed in the fishing boat which employs another kind of a radio positioning system.

Further, in addition to the above structure, the microcomputer within the control box may be electrically connected to the motor for rotating the spool, so that the microcomputer can control the motor based on the fishfinder data, especially based on the depth of the water and fish image on the fishfinder (supposing this control called as a auto positioning control). Therefore, the tackle can be placed on the suitable fishing point (depth) by the auto positioning control. Further, even if the angler should temporarily leave his/her seat, the tackle is not caught by the rock or the like and the tackle does not stray from the suitable position by the auto positioning control. Further, in this structure, a control switch for switching and controlling the auto positioning control may be provided on the fishing reel.

The transmitter installed in the fishing boat may transmit the data to a plurality of fishing reels.

The receiver of the fishing reel may be adapted to communicate to the cellular phone which can connect into Internet. Therefore, the fishing reel can store various kinds of fishing information such as fishing tackle information, fishing technique information and the like.

As mentioned above, according to the invention, since the data from the transmitter received by the receiver is informed by the informing device, the angler can quickly respond to the suitable fishing point (depth) and suitable fishing action.

Further, according to the invention, since the fishing reel receives the correct depth data obtained by the fishfinder and displays it on the display, the angler can put the tackle on the directed fishing point (depth) which is meters from the bottom, and can always adjust the fishing point (depth) so as to keep the tackle along the bottom configuration which always varies. As a result, the catch in fishing is surely increased as compared to the conventional one. If the bottom suddenly varies due to the raise of the reel or the like, since the fishfinder data such as the depth of the water and the tidal current is displayed, there is an advantage that the angler can easily and previously prevent the trouble such as the tackle caught by rocks by himself or herself.

Further, according to the invention, since the present position of the boat and the exact time at the present position can be grasped by receiving the radio from the plurality of the GPS satellites, the exact tidal current and the ebb and flow at the present position can be known.

What is claimed is:

1. A fishing system comprising:
    a transmitter for transmitting fishing information; and
    a fishing reel for winding a fishline on a spool, including,
        a receiver for receiving the fishing information from the transmitter, and an informing device for informing an angler about the fishing information from the receiver,
    wherein the transmitter transmits the fishing information to a plurality of the fishing reels.

* * * * *